United States Patent
Lee et al.

(10) Patent No.: US 8,576,220 B2
(45) Date of Patent: *Nov. 5, 2013

(54) IMAGE PROCESSING METHOD AND ASSOCIATED APPARATUS FOR RENDERING THREE-DIMENSIONAL EFFECT USING TWO-DIMENSIONAL IMAGE

(75) Inventors: Ruen-Rone Lee, Hsinchu Hsien (TW); Tsai-Sheng Wang, Hsinchu Hsien (TW); Chia-Liang Tai, Hsinchu Hsien (TW)

(73) Assignee: MStar Semiconductor, Inc., Hsinchu, Hsien (TW)

( * ) Notice: Subject to any disclaimer, the term of this patent is extended or adjusted under 35 U.S.C. 154(b) by 578 days.

This patent is subject to a terminal disclaimer.

(21) Appl. No.: 12/817,244

(22) Filed: Jun. 17, 2010

(65) Prior Publication Data

US 2010/0321381 A1 Dec. 23, 2010

Related U.S. Application Data

(60) Provisional application No. 61/218,077, filed on Jun. 18, 2009.

(51) Int. Cl.
| | |
|---|---|
| *G06T 15/00* | (2011.01) |
| *G06T 15/10* | (2011.01) |
| *G06T 15/20* | (2011.01) |
| *G06T 17/00* | (2006.01) |
| *G09G 5/00* | (2006.01) |
| *G06K 9/36* | (2006.01) |

(52) U.S. Cl.
USPC ........... 345/419; 345/660; 345/427; 345/428; 345/582; 345/588; 382/285

(58) Field of Classification Search
USPC ............................................. 463/34
See application file for complete search history.

(56) References Cited

U.S. PATENT DOCUMENTS

| | | | |
|---|---|---|---|
| 6,674,484 B1 * | 1/2004 | Boland et al. ................. 348/580 |
| 6,943,805 B2 * | 9/2005 | Snyder et al. ................. 345/589 |
| 7,171,630 B2 * | 1/2007 | O'Leary et al. ............... 715/856 |
| 2009/0058883 A1 * | 3/2009 | Piotrowski et al. ........... 345/656 |

OTHER PUBLICATIONS

O.D. Evans, Efficient Implementation of Image Warping on a Multimedia Porcessor, Master thesis for the degree of Master of Science in Electrical Engineering, University of Washington, Dec. 1996.*

* cited by examiner

*Primary Examiner* — Kee M Tung
*Assistant Examiner* — Haixia Du
(74) *Attorney, Agent, or Firm* — Edell, Shapiro & Finnan, LLC

(57) ABSTRACT

An image processing apparatus is for rendering a three-dimensional (3D) effect by transforming a first quadrilateral image to a second quadrilateral image. The apparatus includes a target image determining unit, a block determining unit and a graphic unit. The target image determining unit generates an outline associated with the second quadrilateral image according to the first quadrilateral image and the 3D effect. The block determining unit divides an area within the outline into a plurality of second blocks and correspondingly determines a plurality of first blocks from the first quadrilateral image. The graphic unit scales image data of the first blocks to respectively generate image data of the second blocks to obtain the second quadrilateral image.

10 Claims, 9 Drawing Sheets

$\Delta H = H1/H2$

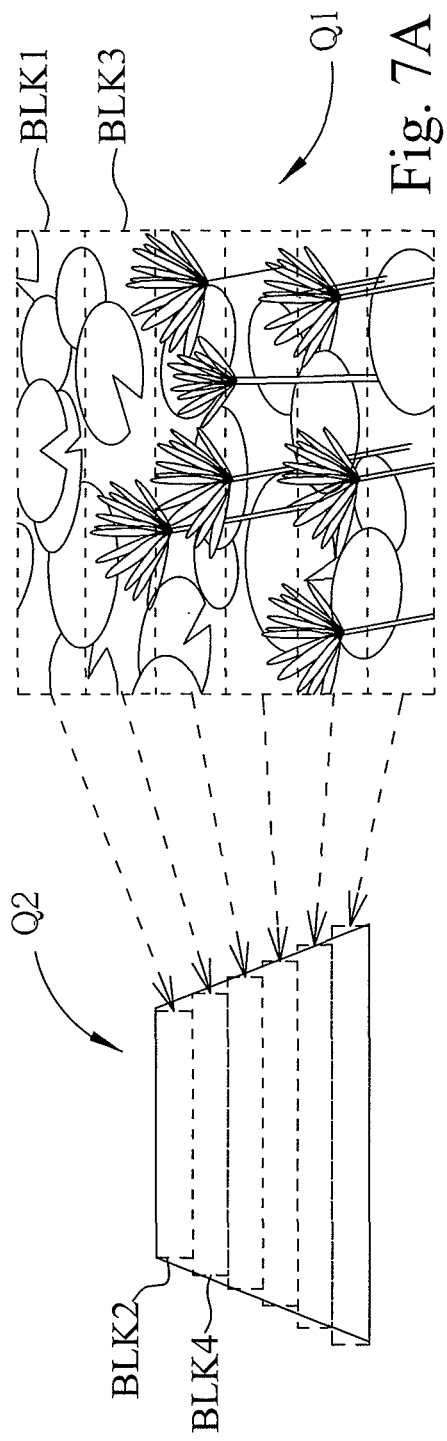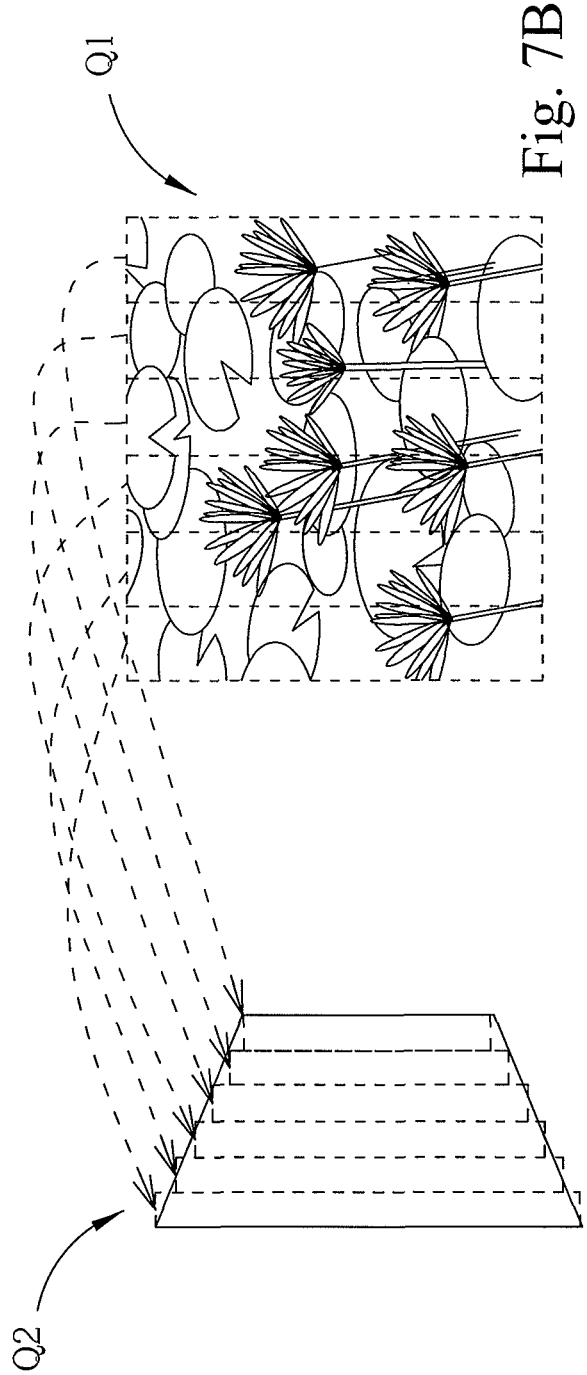

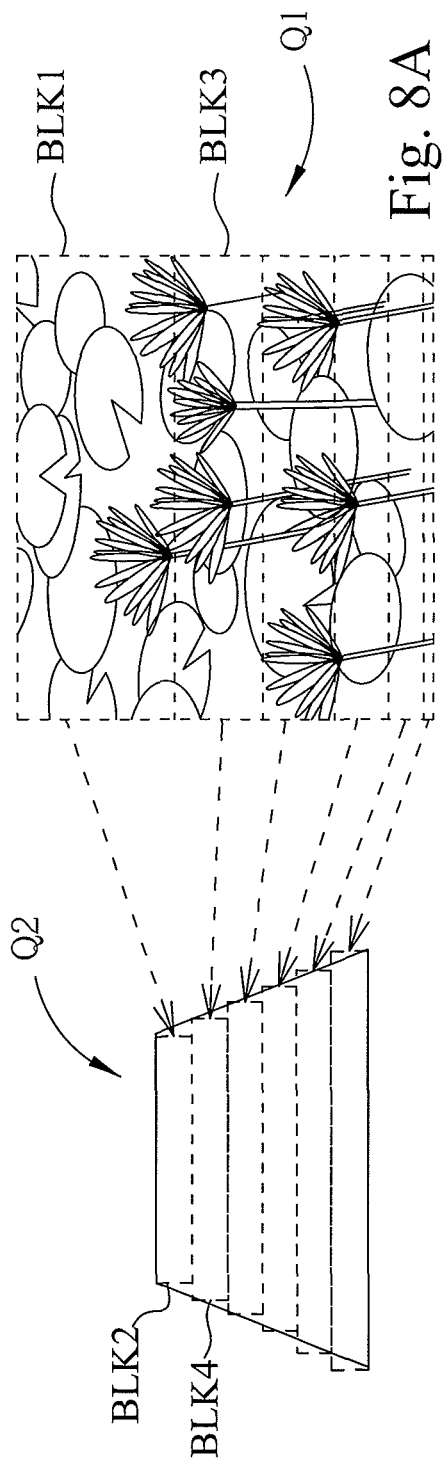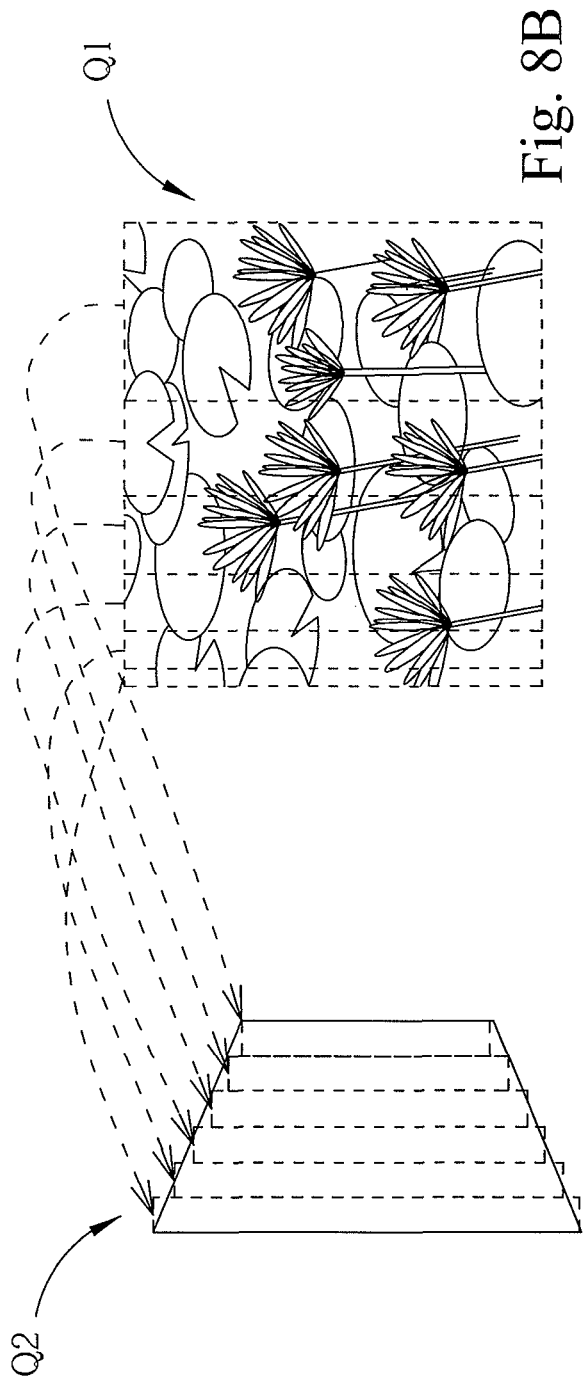

IMAGE PROCESSING METHOD AND ASSOCIATED APPARATUS FOR RENDERING THREE-DIMENSIONAL EFFECT USING TWO-DIMENSIONAL IMAGE

CROSS REFERENCE TO RELATED PATENT APPLICATION

This patent application claims the benefit of a U.S. provisional patent application No. 61/218,077 filed on Jun. 18, 2009, which is incorporated herein by reference in its entirety.

FIELD OF THE INVENTION

The present invention relates to a mechanism for rendering a three-dimensional (3D) effect, and more particularly, to an image processing method and an associated apparatus for rending a 3D effect using two-dimensional (2D) images.

BACKGROUND OF THE INVENTION

In a current user interface system, e.g., a user interface of a portable device like a mobile phone, methods for rendering graphics or images include a 2D image rendering approach and a 3D image rendering approach. The 2D image rendering approach is easier and less expensive to implement, yet has a disadvantage of lacking depth information. The 3D image rendering approach, although having an advantage of being capable of rendering better visual enjoyment to viewers using its depth information, is burdened with more complicated and more costly implementation. More specifically, when the 3D image rendering approach is realized by hardware, corresponding hardware cost is much higher than that of the 2D image rendering approach; when the 3D image rendering approach is realized by software, a processor needs to designate more resources and time in rendering the 3D images such that a processor performance may be significantly degraded due to the 3D image rendering approach.

SUMMARY OF THE INVENTION

Therefore, it is an objective of the invention to provide an image processing method and an associated apparatus for rendering a 3D effect using 2D images, so as to overcome complications involved in the 3D image rendering approach to reduce software and hardware costs as well as enhancing an overall system performance.

The present invention provides an image processing method for rendering a 3D effect by transforming a first quadrilateral image to a second quadrilateral image. The image processing method comprises: providing the first quadrilateral image; generating an outline associated with the second quadrilateral image according to the first quadrilateral image and the 3D effect; dividing an area within the outline into a plurality of second blocks, and correspondingly determining a plurality of first blocks from first quadrilateral image; scaling image data of the first blocks to respectively generate the image data of the second blocks to obtain the second quadrilateral image.

The present invention further provides an image processing apparatus for rendering a 3D effect by transforming a first quadrilateral image to a second quadrilateral image. The image processing apparatus comprises a target image determining unit, a block determining unit and a graphic unit. The target image determining unit generates an outline associated with the second quadrilateral image according to the first quadrilateral image and the 3D effect. The block determining unit divides an area within the outline into a plurality of second blocks, and correspondingly determines a plurality of first blocks from the first quadrilateral image. The graphic unit scales image data of the first blocks to respectively generate image data of the second blocks to obtain the second quadrilateral image.

BRIEF DESCRIPTION OF THE DRAWINGS

The present invention will become more readily apparent to those ordinarily skilled in the art after reviewing the following detailed description and accompanying drawings, in which:

FIGS. 7A and 7B are schematic diagrams illustrating a corresponding relationship of blocks between the quadrilateral images Q1 and Q2 determined by the block determining unit;

FIGS. 8A and 8B are schematic diagrams illustrating another corresponding relationship of blocks between the quadrilateral images Q1 and Q2 determined by the block determining unit.

DETAILED DESCRIPTION OF THE PREFERRED EMBODIMENT

For a three-dimensional (3D) rendering approach, hardware costs and system resources for rendering operation icons or images of a user interface system are quite high. Therefore, a two-dimensional (2D) rendering approach according to one embodiment of the invention is provided as a novel image processing approach for rendering operation icons or images of a user interface system, so as to render a 3D effect using 2D images without degrading an overall system performance while also bringing better visual enjoyment to a user operating the user interface system. According to an embodiment of the invention, the image processing method and apparatus generate images that render at least one 3D effect, including image reshaping, rotating, twisting or expansion effects, and lighting effects. The image processing method and apparatus, based on 2D images that require no Z-axis information (i.e., image depth information), is capable of rendering the 3D effect. Thus, resources that a processor or a calculation unit employs for calculations are significantly reduced, thus enhancing an overall system calculation performance. More specifically, when the image processing method and apparatus according to an embodiment of the invention is realized by hardware, cost of hardware previously applied for the conventional 2D image drawing method may only be slightly increased while cost of hardware previously needed to show 3D effects is reduced. Therefore, the method and apparatus of the invention offer cost advantages whether being realized by software or hardware.

Icons of a user interface system are mostly quadrilateral icons, and more particularly, rectangular and square icons. According to a principle of the invention, when a quadrilateral icon flips or rotates toward a predetermined angle, a series of images during the transformation between an original image to a final image (i.e., a generated image) are simulated as a plurality of different successive images that are trapezoidal or a rectangular in shape. Therefore, the method and apparatus according to an embodiment of the invention, according to flipping or rotation angles of different 3D effects, calculates a shape associated with each quadrilateral image to be generated in order to respectively generate a quadrilateral image. For example, the shape of a quadrilateral icon at a latter of two successive time points is calculated according to a difference between rotation angles of the two successive time points; alternatively, the shape of a quadrilateral icon at a current time points is calculated according to a difference of rotation angles between the current-time-point image and an original image—other similar modifications are also within the scope of the invention.

Figure 1:
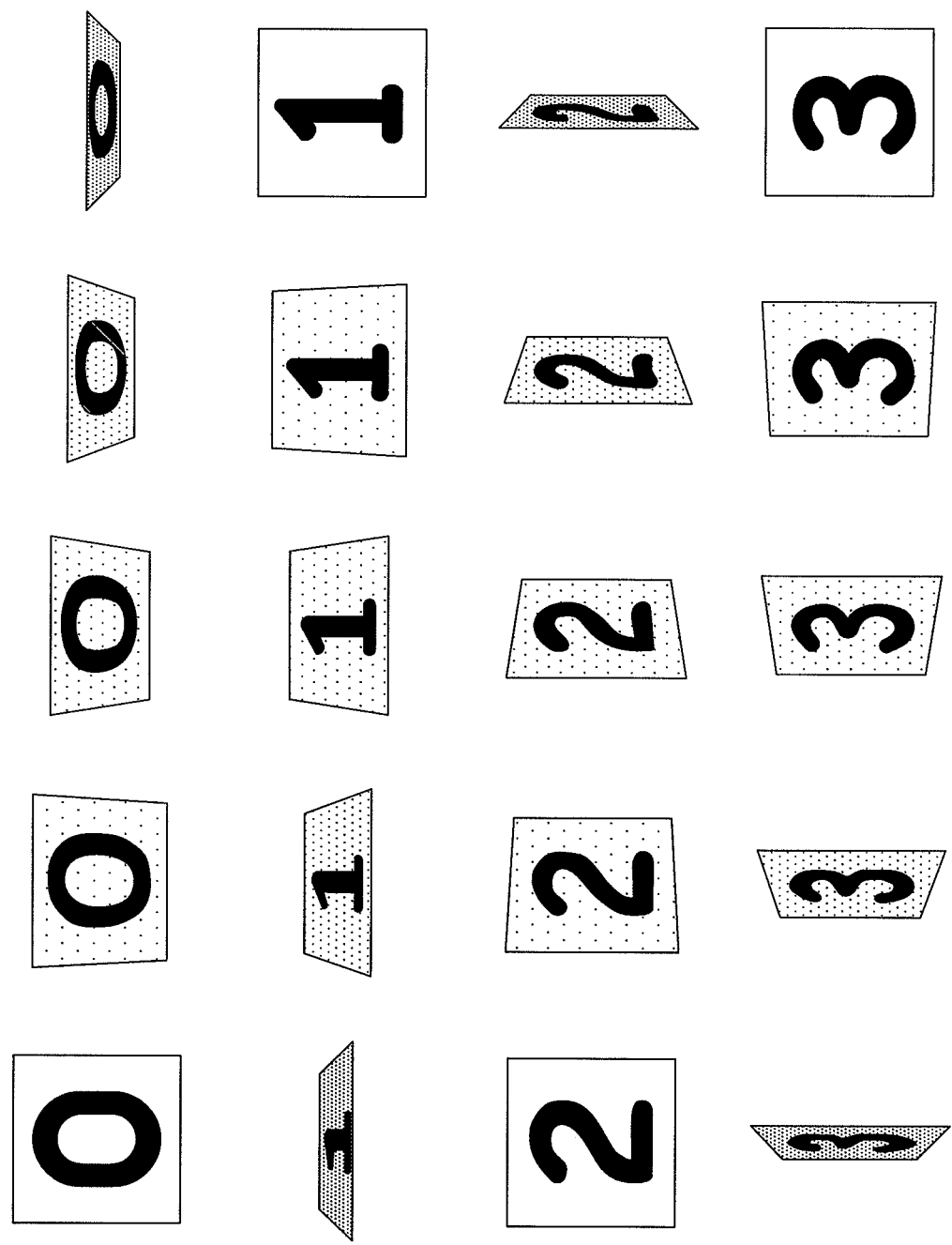
FIG. 1 is a schematic diagram of rendering a 3D effect according to an embodiment of the invention.

FIG. 1 shows a schematic diagram of rendering a 3D effect using 2D images according to an embodiment of the invention. As shown in FIG. 1, icons of the user interface system render a flipping or rotation effect in a 3D space, such as flipping vertically (e.g., icons "0" and "1"), or flipping horizontally (e.g., icons "2" and "3"). Taking the icon "0" for example, in order to render a 3D effect, a series of images transformed from an originally rectangular icon "0" are a plurality of different trapezoidal images when flipping vertically. As an angle of flipping gets larger, a height of the series of trapezoidal images of the icons "0" gradually reduces (from time t1 to t5), so as to render a visual effect of the icon "0" flipping vertically in a 3D space. Taking the icon "1" for example, a series of images transformed from an icon "1" in an originally shallow trapezoidal image are a plurality of different trapezoidal and square images when flipping vertically. As an angle of flipping gets larger, a height of the series of the trapezoidal images of the icon "1" gradually increases (from time t1 to t5), so that one may perceive the shape of the images "1" restore to a normal shape (i.e., the square image) from a shallow shape as the height of the trapezoidal images becomes larger to render a visual effect of the icon "1" flipping vertically in a 3D space. Again, taking the icon "2" for example, a series of images transformed from the icon "2" in an original square image are a plurality of different trapezoidal images when flipping horizontally. As an angle of flipping gets larger, a height of the series of the trapezoidal images of the icon "2" gradually reduces from time t1 to t5 (the height of the series of trapezoidal images of the icon "2" is a width of the images), so that one may perceive the shape of the icon "2" gradually become shallow as the height of the trapezoidal images becomes smaller to render a visual effect of the icon "1" flipping horizontally in a 3D space. Similarly, a height of a series of trapezoidal images of the icon "3" gradually becomes larger from time t1 to t5, so as to render a visual effect of the icon "3" flipping horizontally in a 3D space. To emphasize a 3D effect of the icon, brightness of a series of trapezoidal images is appropriately adjusted. For example, suppose a light source is right in front of the images. Brightness of the series of images dims as the icon "0" flips from a front side downwards to face down or as the icon "2" flips from a front side rightwards to face a side. In contrast, brightness of the series of images becomes brighter as the icon "1" flips frontwards from facing a side to a front side or as the icon "3" flips rightwards from facing a side to a front side. In FIG. 1, dots are used to indicate differences in brightness, i.e., images with a large number of dots are dimmer in brightness, images with a smaller number of dots are brighter in brightness, and the square image without any dots means it has maximum brightness. The icons "0" to "3" are used for illustrating effects provided by the method and apparatus of the invention, but are not to limit the invention thereto. Description of realizing an embodiment of the invention by hardware shall be given below.

Figure 2:
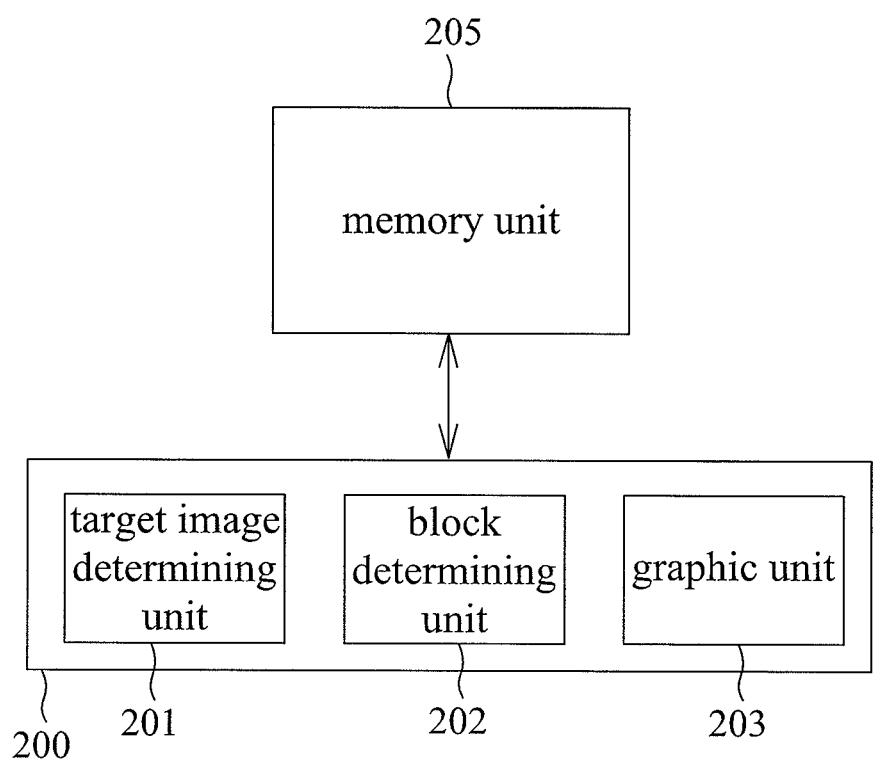
FIG. 2 is a schematic diagram of an image processing apparatus according to an embodiment of the invention.
Figure 3:
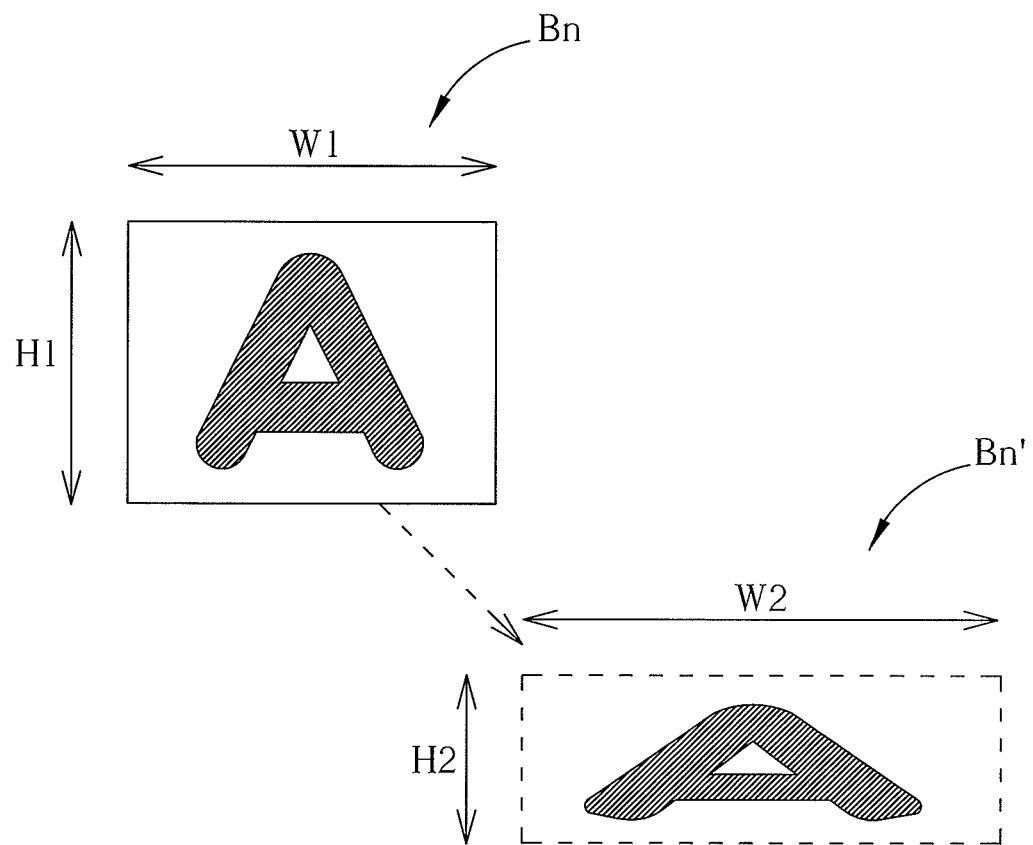
FIG. 3 illustrates an example of the graphic unit in FIG. 2 scaling a block.

FIG. 2 shows a schematic diagram of an image processing apparatus 200 according to a preferred embodiment of the invention. An image processing apparatus 200 comprises a target image determining unit 201, a block determining unit 202 and a graphic unit 203. The image processing apparatus 200 is coupled to a memory unit 205, which is for storing image data (including a plurality of pixel values) of a quadrilateral image Q1 corresponding to a predetermined image. The target image determining unit 201 first generates coordinates of four vertices associated with the quadrilateral image Q2 according to coordinates of four vertices of the quadrilateral image Q1 and a desired 3D effect. Once the four vertices of the quadrilateral image Q2 are obtained, an outline of the quadrilateral image Q2 can be determined. The block determining unit 202 divides the outline of the quadrilateral image Q2 into a plurality of blocks, and determines from the quadrilateral image Q1 blocks that are corresponding to the blocks of the quadrilateral image Q2. According to relationships between the corresponding blocks of the quadrilateral images Q1 and Q2, the graphic unit 203 then respectively scales image data of the corresponding blocks of the quadrilateral image Q1 to generate image data (i.e., pixel values of a plurality of pixels in each block) of blocks of the quadrilateral image Q2. FIG. 3 illustrates an example of the graphic unit 203 in FIG. 2 scaling a block by means of stretch bit-block transfer. For example, suppose a block Bn is one of the corresponding blocks of the quadrilateral image Q1 and is a rectangle (represented by a frame of solid lines), which has a width W1 and a height H1 and comprises an image "A". From the memory unit 205, the graphic unit 203 reads image data of the block Bn and scales the accessed image data to generate scaled image data "A" in a rectangle (represented by a frame of dotted lines), which has a width W2 and a height H2. The rectangle in the dotted lines represents a block Bn' of the quadrilateral image Q2 corresponding to the block Bn. Accordingly, the image processing apparatus 200 respectively generates quadrilateral images for rendering the 3D effect. For example, the 3D effect is the quadrilateral image Q1 displaying a rotating effect in a 3D space. The quadrilateral images are then transmitted to and displayed on a monitor to provide a viewer with the 3D effect of the 2D image.

In this embodiment, the 2D image is, e.g., an icon of a user interface system, and the quadrilateral images Q1 and Q2 are images of two successive time points, with the quadrilateral image Q1 being an image at a former time point of the 2D image (i.e., the icon) during the flipping or rotation, and the quadrilateral image Q2 being an image at a latter time point of the 2D image during the flipping or rotation. For example, the 2D image is the icon "0" in FIG. 1, the quadrilateral image Q1 is the square image of the image "0" at the time t1, and the quadrilateral image Q2 is the trapezoidal image of the icon "0" at the time t2. The quadrilateral image Q1 may also be the trapezoidal image of the icon "0" at the time t3, and the quadrilateral image Q2 may also be the trapezoidal image of the icon "0" at the time t4. Further, when the 2D image is the icon "1" in FIG. 1, the quadrilateral image Q1 may be the trapezoidal image of the icon "1" at the time t2, and the quadrilateral image Q2 may be the trapezoidal image of the icon "1" at the time t3. The quadrilateral image Q1 may also be the trapezoidal image of the icon "1" at the time t4, and the quadrilateral image Q2 may also be the square image of the icon "1" at the time t5. In other words, the image processing apparatus 200 is capable of generating flipped or rotated images after according to different desired flipping or rotation angles of the icon in a 3D space.

Again with reference to FIG. 2, the target image determining unit 201 is for generating the coordinates of the four vertices of the quadrilateral image Q2 according to the coordinates of the four vertices of the quadrilateral image Q1 as well as desired angle and direction of flipping or rotation. In this embodiment, the quadrilateral image Q1 is a source image, whose data is stored in the memory unit 205. In practice, the target image determining unit 201 may be realized by hardware or software.

Figure 4:
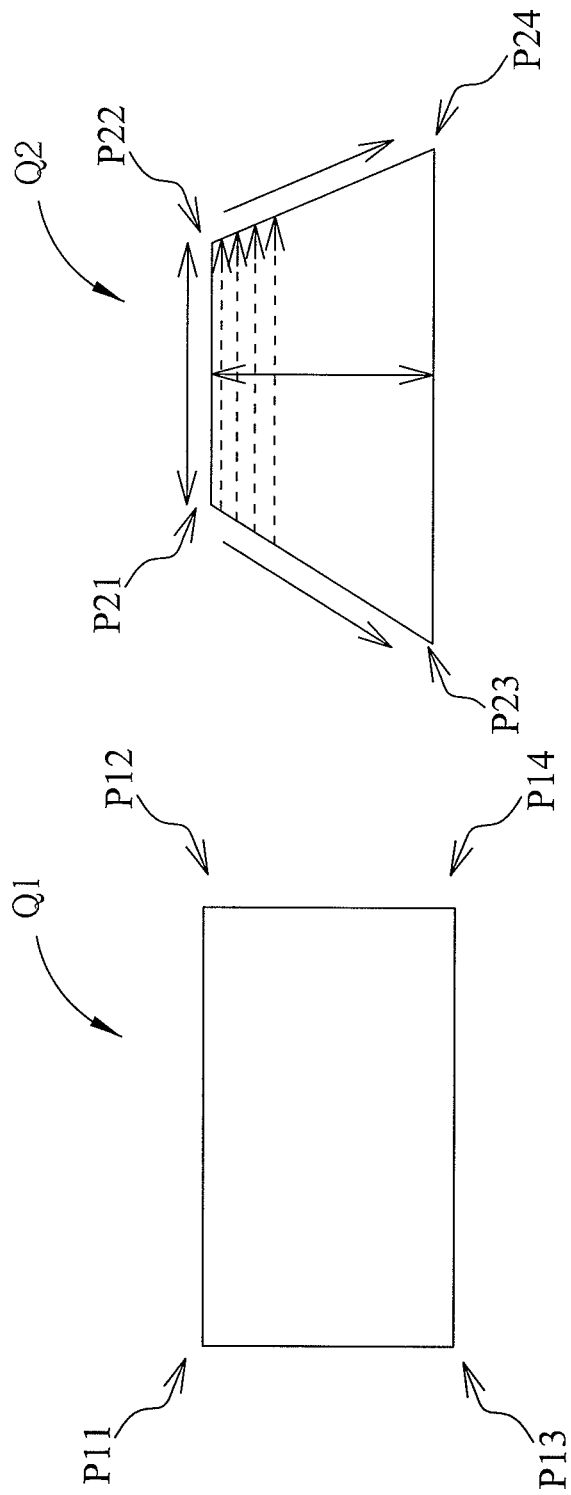
FIG. 4 is an example of quadrilateral images Q1 and Q2 according to one embodiment of the invention.
Figure 5B:
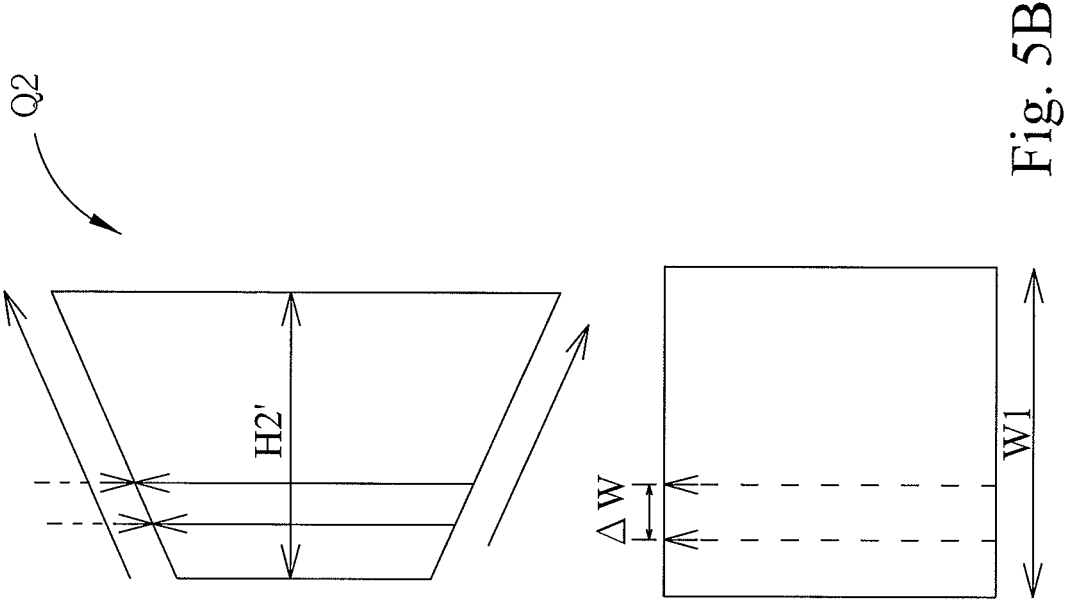
FIGS. 5A and 5B are schematic diagrams illustrating a relationship between corresponding scan lines of the quadrilateral images Q1 and Q2.
Figure 5A:
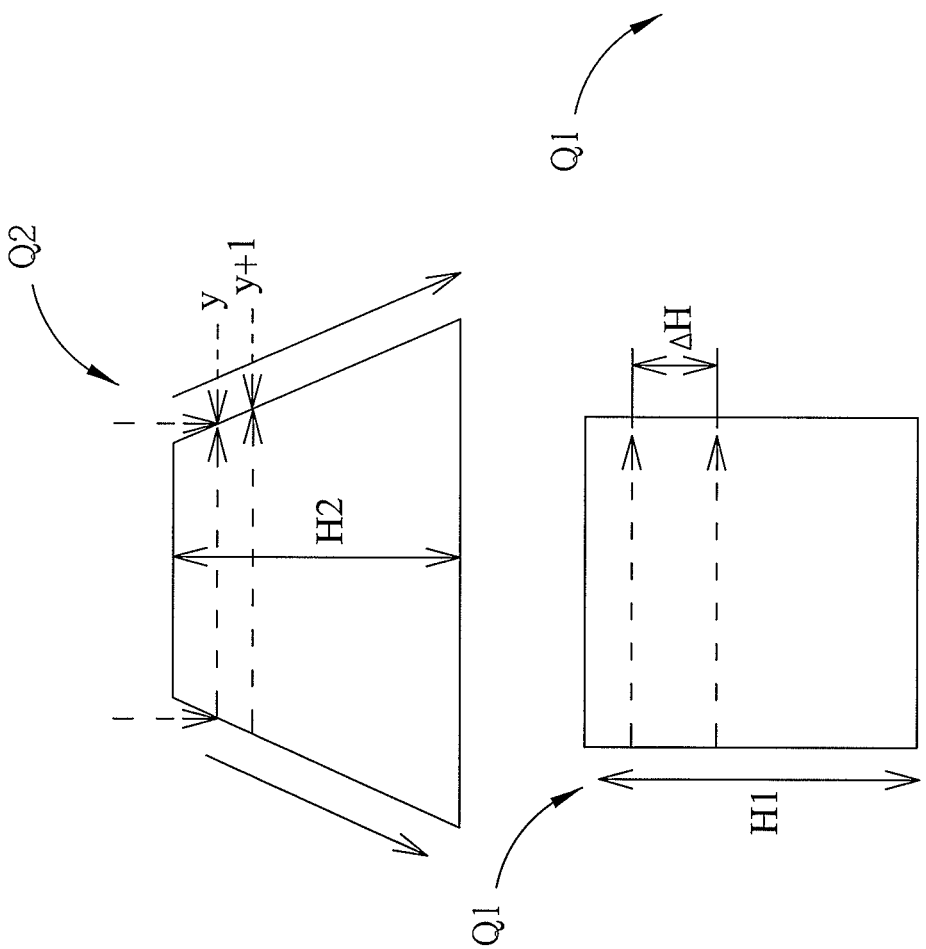

With reference to FIG. 4, the block determining unit 202 calculates change rates of coordinates at two sides of the trapezoidal image Q2 (i.e., the change rates of the planar coordinates P21 and P23 of the two left vertices, and the change rates of the planar coordinates P22 and P24 of the two right vertices of the quadrilateral image Q2) to respectively obtain a first coordinate change rate and a second coordinate change rate. With the first and second coordinate change rates, coordinates of two terminal points of each scan line of the trapezoidal image can be obtained. Modifications may be made to the foregoing approaches of dividing the quadrilateral image Q2 into the plurality of blocks and determining from the quadrilateral image Q1 the plurality of blocks corresponding to the blocks of the quadrilateral image Q2. For example, in the first embodiment, the quadrilateral image Q2 is divided into a plurality of rectangular blocks in a unit of one scan line, and the block determining unit 202 then determines from the quadrilateral image Q1 a plurality of rectangular blocks, wherein each rectangular block of the quadrilateral images Q1 and Q2 has a same size as that of a single scan line. FIGS. 5A and 5B are schematic diagrams illustrating a relationship between corresponding scan lines of the quadrilateral images Q1 and Q2. As shown in FIG. 5A, the quadrilateral image Q2 is a trapezoid having parallel upper and lower sides. The block determining unit 202 calculates in the quadrilateral image Q1 an average distance ΔH corresponding to a distance between two neighboring horizontal scan lines of the quadrilateral image Q2, and a corresponding horizontal scan line is selected from the quadrilateral image Q1 according to the average distance ΔH. Further, as shown in FIG. 5B, the quadrilateral image Q2 is a trapezoid having parallel left and right sides. The block determining unit 202 calculates in the quadrilateral image Q1 an average distance ΔW corresponding to a distance between two neighboring vertical scan lines of the quadrilateral image Q2, and a corresponding vertical scan line is selected from the quadrilateral image Q1 according to the average distance ΔW.

Figure 6B:
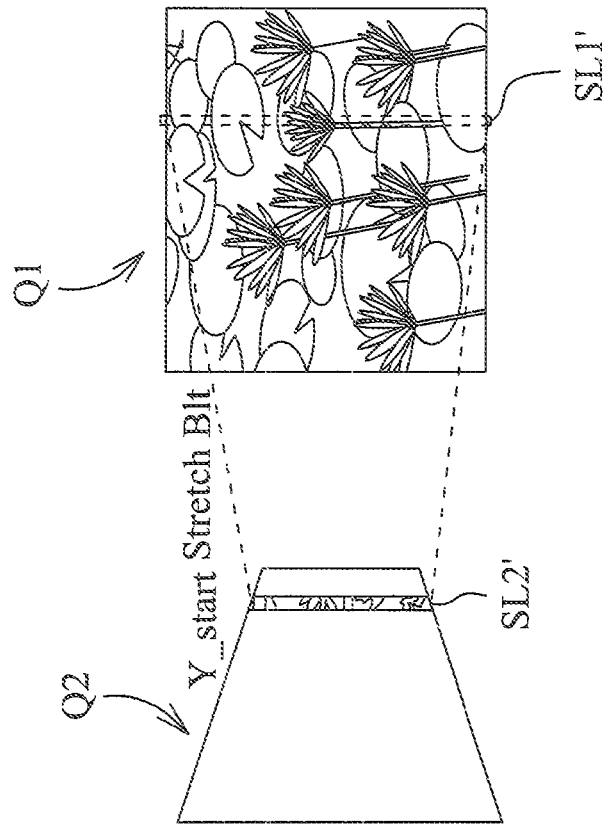
FIGS. 6A and 6B show an example of correspondingly generating an image of a scan line area SL2 of the quadrilateral image Q2 by scaling an image of a scan line area SL1 of the quadrilateral image Q1.
Figure 6A:
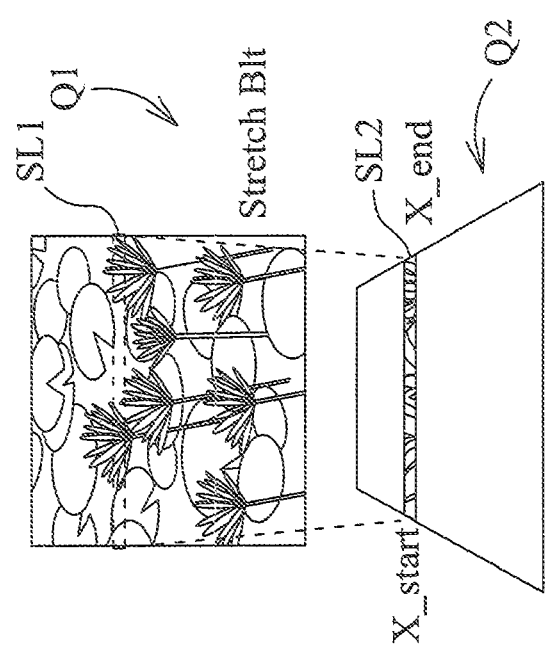

In this embodiment, the graphic unit 203 respectively scales images of the selected scan lines of the quadrilateral image Q1 to generate images corresponding to scan lines of the quadrilateral image Q2. That is, in this embodiment, the graphic unit 203 scales an image of each scan line in a horizontal or vertical direction. FIGS. 6A and 6B show an example of correspondingly generating an image of a scan line area SL2 of the quadrilateral image Q2 by scaling an image of a scan line area SL1 of the quadrilateral image Q1. As shown in FIG. 6A, the graphic unit 203 selects a corresponding scan line (e.g., SL1) in the quadrilateral image Q1, and scales the image of the corresponding scan line to generate the image of a scan line (e.g., SL2) in the quadrilateral image Q2. As shown in FIG. 6B, the graphic unit 203 selects a corresponding scan line (e.g., SL1') in the quadrilateral image Q2, and scales the image of the corresponding scan line to generate the image of a scan line (e.g., SL2') in the quadrilateral image Q2.

Further, in the second embodiment, the area of each rectangular block of the quadrilateral image Q2 determined by the block determining unit 202 is covered by a single scan line; however, the corresponding rectangular blocks of the quadrilateral image Q1 may be an area covered by a plurality of scan lines, and the graphic unit 203 respectively scales images of a plurality of scan lines in the quadrilateral image Q1 to generate an image corresponding to the scan lines in the quadrilateral image Q2. FIGS. 7A and 7B are schematic diagrams illustrating a corresponding relationship of a block between the quadrilateral images Q1 and Q2 determined by the block determining unit. As shown in FIG. 7A, rectangular blocks in the quadrilateral image Q1 are equal in size, and respectively correspond to a horizontal scan line of the quadrilateral image Q2, as indicated by dotted arrows. Image data of each rectangular block in the quadrilateral image Q1 is scaled by the graphic unit 203 to generate image data of the corresponding horizontal scan line in the quadrilateral image Q2. For example, after being divided by the block determining unit 202, the quadrilateral image Q1 comprises a rectangular block BLK3 corresponding to a rectangular block BLK4 in the quadrilateral image Q2. The rectangular block BLK3 comprises a plurality of scan lines, and the rectangular block BLK4 comprises a single scan line. Further, as shown in FIG. 6B, the rectangular blocks in the quadrilateral image Q1 are equal in size, and image data of each rectangular block of the quadrilateral image Q1 is scaled by the graphic unit 203 to generate image data of corresponding vertical scan line of the quadrilateral image Q2—details thereof are similar to those of the example shown in FIG. 6A, and shall be omitted for brevity.

To further enhance image quality, according to a third embodiment of the invention, apart from defining the rectangular blocks in the quadrilateral image Q1 to cover an area of a single scan line or a plurality of scan lines, the rectangular blocks may have different sizes from one another. FIGS. 8A and 8B are schematic diagrams illustrating corresponding relationships between differently sized rectangular blocks of the quadrilateral image Q1 and same sized rectangular blocks of the quadrilateral image Q2 divided by the block determining unit 202. As shown in the diagrams, narrower regions or smaller blocks in the quadrilateral image Q2 correspond to larger rectangular blocks in the quadrilateral image Q1, meaning that areas of corresponding blocks of the quadrilateral images Q1 and Q2 show an inverse non-linear relationship.

Figure 9:
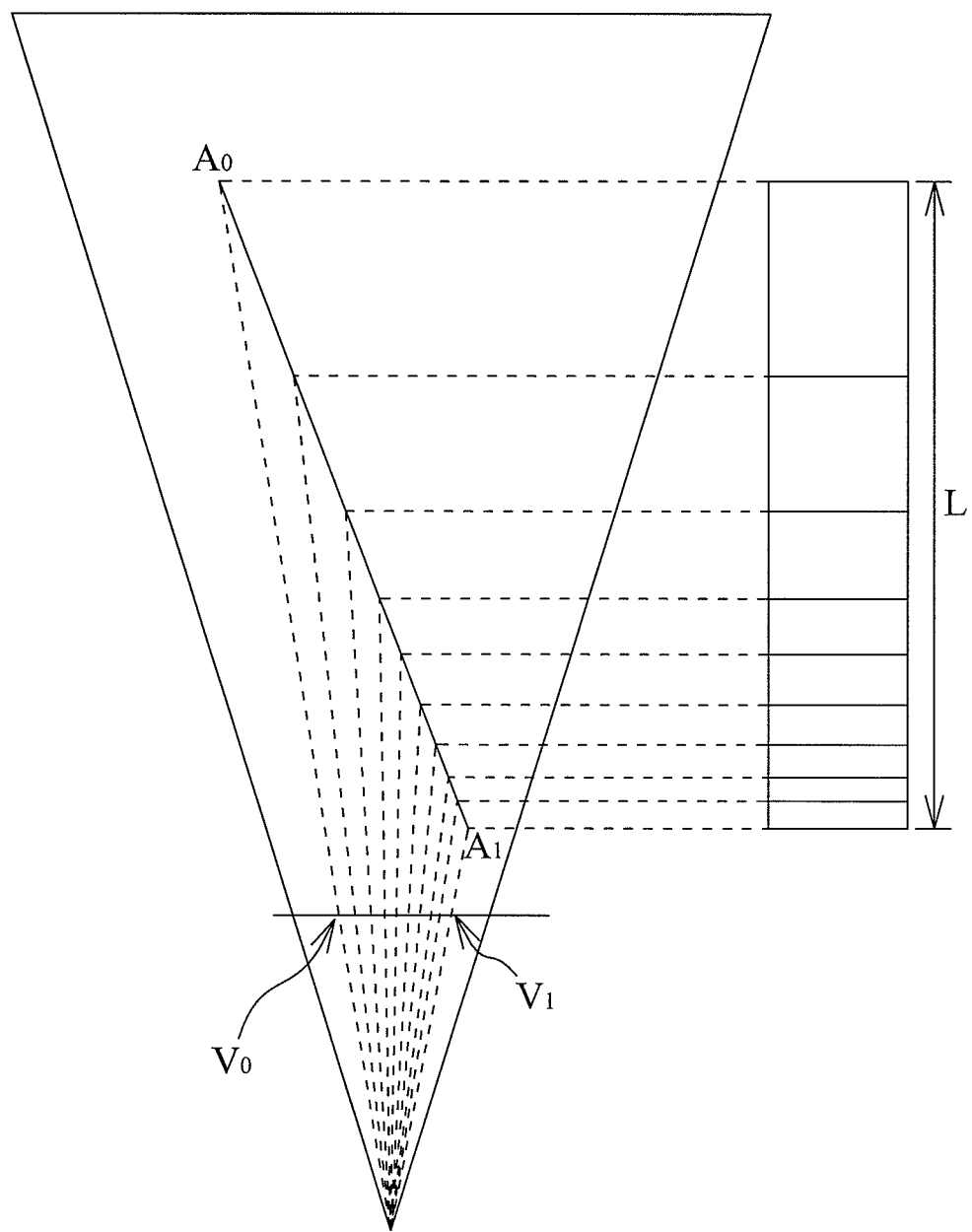
FIG. 9 is a schematic diagram illustrating a relationship between reciprocals of depth information and block sizes of the quadrilateral image Q1 according to a third embodiment of the invention.

In the third embodiment, the block determining unit 202 calculates an area and planar coordinates of each rectangular block of the quadrilateral image Q1 with reference to a predetermined rotation angle corresponding to the quadrilateral image Q2. In other words, the block determining unit 202 generates the above inverse non-linear relationship by referencing Z-axis information (i.e., depth information of the rotated image). In the rotated image, a part in the image with depth information having a greater absolute value corresponds to a part with a greater area in the image before rotation; at this point, between a block size and depth information of the image before rotation is a positively non-linear relationship. To obtain the non-linear relationship between the block size and depth information of the image before rotation, the block determining unit 202 gives a linear relationship between a reciprocal of the absolute value of the depth information and the block size of the image and to accordingly determine how the rectangular blocks in the quadrilateral image Q1 are to be divided. FIG. 9 shows a schematic diagram illustrating a relationship between reciprocals of depth information and block sizes of the quadrilateral image Q1 according to a third embodiment of the invention. The reciprocal of the depth information has a minimum value V0 and a maximum value V1. A different value of the reciprocal of the depth information corresponds to a different height value of the quadrilateral image Q2. The block determining unit 202 evenly divides a range between the minimum value $V_0$ and the maximum value $V_1$ of the depth information. However, as observed from FIG. 9, although the range between the minimum value $V_0$ and the maximum value $V_1$ of the depth information is evenly divided, the quadrilateral image Q2 is correspondingly divided into rectangular blocks having different sizes. Therefore, the block determining unit 202 first determines that a distance between two neighboring horizontal scan lines of the quadrilateral image Q2 results in an average variation $\Delta\sigma$ in the reciprocal of the depth information, and the reciprocal of the depth information results in an average distance $\Delta A$ in the quadrilateral image Q1. The average variation $\Delta\sigma$ and the average distance $\Delta A$ are represented by the equations below:

$$\Delta A = \frac{\left(\frac{A_1}{z_1} - \frac{A_0}{z_0}\right)}{L} \quad \text{Equation (1)}$$

$$\Delta\sigma = \frac{\left(\frac{1}{z_1} - \frac{1}{z_0}\right)}{L} \quad \text{Equation (2)}$$

Wherein, $z_0$ is depth information corresponding to a start point height value $A_0$ of the quadrilateral image Q2, $z_1$ is an end point height value $A_1$ of the quadrilateral image Q2, and L is a height of the trapezoid. According to Equations 1 and 2, the block determining unit 202 can calculate a location difference $\Delta P(i)$ in the quadrilateral image Q1 corresponding to a distance from an $i-1^{st}$ scan line to an $i^{th}$ scan line in the quadrilateral image Q2:

$$\Delta P(i) = \frac{\left(\frac{A_0}{z_0} + \Delta A \times i\right)}{\left(\frac{1}{z_0} + \Delta\sigma \times i\right)} \quad \text{Equation (3)}$$

With a result calculated from Equation 3, the block determining unit 202 obtains coordinates of four vertices of a block in the quadrilateral image Q1 corresponding to the distance from the $i-1^{st}$ scan line to the $i^{th}$ scan line in the quadrilateral image Q2. Therefore, the block determining unit 202 is able to scale the quadrilateral image Q1 by dividing the quadrilateral image Q1 into a plurality of differently sized blocks to enhance the simulation effect when flipping or rotating an image in a 3D space.

Further, when generating image pixels of the quadrilateral image Q2, the graphic unit 203 may correspondingly adjust brightness of the quadrilateral image Q2 according to a rotation angle of the icon (i.e., an angle by which the quadrilateral image Q1 rotates to the quadrilateral angle Q2) to render the icon with an even more realistic 3D visual effect. The foregoing embodiments are given with examples of processing icons of a user interface system; however, with proper modifications, the concept of the invention is also applicable to 3D effect simulations of any other images in a user interface system, as such modifications are also within the scope of the invention.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An image processing method, for rendering a three-dimensional (3D) effect by transforming a first quadrilateral image to a second quadrilateral image and displaying the same on a monitor, the method comprising:
    providing the first quadrilateral image;
    generating an outline associated with the second quadrilateral image according to the first quadrilateral image and the 3D effect;
    dividing an area within the outline into a plurality of second blocks, and correspondingly determining a plurality of first blocks from the first quadrilateral image;
    scaling image data of the first blocks to respectively generate image data of the second blocks to obtain the second quadrilateral image; and
    displaying the second quadrilateral image on the monitor,
    wherein the first blocks comprise a first corresponding block and a second corresponding block, the first corresponding block comprises a first predetermined number of scan lines, and the second corresponding block comprises a second predetermined number of scan lines,
    wherein in accordance with an inverse non-linear relationship, the first predetermined number of scan lines is larger than the second predetermined number of scan lines when the block, within the second blocks, corresponding to the first corresponding block is narrower or smaller than the block, within the second blocks, corresponding to the second corresponding block.

2. The image processing method as claimed in claim 1, wherein the 3D effect is a rotation effect of the first quadrilateral image in a 3D space.

3. The image processing method as claimed in claim 2, wherein the outline associated with the second quadrilateral image is generated according to a rotation angle of the first quadrilateral image.

4. The image processing method as claimed in claim 3, wherein the first blocks are determined according to depth information corresponding to the rotation angle of the first quadrilateral image.

5. The image processing method as claimed in claim 1, wherein the first blocks are determined according to relative height information between the outline and the first quadrilateral image.

6. An image processing apparatus, for rendering a 3D effect by transforming a first quadrilateral image to a second quadrilateral image, the apparatus comprising:
    a target image determining unit configured to generate an outline associated with the second quadrilateral image according to the first quadrilateral image and the 3D effect;
    a block determining unit configured to divide an area within the outline into a plurality of second blocks, and correspondingly determine a plurality of first blocks from the first quadrilateral image;

a graphic unit configured to scale image data of the first blocks to respectively generate image data of the second blocks to obtain the second quadrilateral image; and a monitor for displaying the second quadrilateral image, wherein the first blocks comprise a first corresponding block and a second corresponding block, the first corresponding block comprises a first predetermined number of scan lines, and the second corresponding block comprises a second predetermined number of scan lines, wherein in accordance with an inverse non-linear relationship, the first predetermined number of scan lines is larger than the second predetermined number of scan lines when the block, within the second blocks, corresponding to the first corresponding block is narrower or smaller than the block, within the second blocks, corresponding to the second corresponding block.

7. The image processing apparatus as claimed in claim 6, wherein the 3D effect is a rotation effect of the first quadrilateral image in a 3D space.

8. The image processing apparatus as claimed in claim 7, wherein the target image determining unit determines the outline associated with the second quadrilateral image according to a rotation angle of the first quadrilateral image.

9. The image processing apparatus as claimed in claim 8, wherein the block determining unit determines the first blocks according to depth information corresponding to the rotation angle of the first quadrilateral image.

10. The image processing apparatus as claimed in claim 6, wherein the block determining unit determines the first blocks according to relative height information between the outline and the first quadrilateral image.

\* \* \* \* \*